US011495971B2

(12) United States Patent
Brombach et al.

(10) Patent No.: US 11,495,971 B2
(45) Date of Patent: Nov. 8, 2022

(54) METHOD FOR FEEDING ELECTRICAL POWER INTO AN ELECTRICAL SUPPLY NETWORK

(71) Applicant: Wobben Properties GmbH, Aurich (DE)

(72) Inventors: Johannes Brombach, Berlin (DE); Eckard Quitmann, Bremen (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/966,739

(22) PCT Filed: Jan. 31, 2019

(86) PCT No.: PCT/EP2019/052377
§ 371 (c)(1),
(2) Date: Jul. 31, 2020

(87) PCT Pub. No.: WO2019/149818
PCT Pub. Date: Aug. 8, 2019

(65) Prior Publication Data
US 2020/0366100 A1 Nov. 19, 2020

(30) Foreign Application Priority Data

Feb. 1, 2018 (DE) .................... 10 2018 102 224.7

(51) Int. Cl.
*H02J 3/38* (2006.01)
*H02P 9/42* (2006.01)
(Continued)

(52) U.S. Cl.
CPC .............. *H02J 3/381* (2013.01); *H02J 3/388* (2020.01); *H02P 9/42* (2013.01); *H02J 3/46* (2013.01);
(Continued)

(58) Field of Classification Search
CPC ........ H02J 3/388; H02J 3/001; H02J 2300/28; H02P 9/42
See application file for complete search history.

(56) References Cited

U.S. PATENT DOCUMENTS 10,683,846 B2 6/2020 Brombach et al.
2012/0292904 A1 11/2012 Tarnowski
(Continued)

FOREIGN PATENT DOCUMENTS

DE 102016115431 A1 2/2018

OTHER PUBLICATIONS

Fu et al., "Damping Control of PMSG-Based Wind Turbines for Power System Stability Enhancement", Renewable Power Generation Conference (RPG 2013), Beijing, 2013, pp. 1-4.
(Continued)

*Primary Examiner* — Joseph Ortega
(74) *Attorney, Agent, or Firm* — Seed Ip Law Group LLP

(57) ABSTRACT

A method for exchanging or feeding electric power into an electricity supply grid that has a grid frequency using a converter-controlled generator at a grid connection point is provided. The method includes feeding in electric power depending on a control function, where the electric power may comprise active and reactive power, and the control function controls the power depending on at least one state variable of the grid. It is possible to select between a normal control function and a support control function, different from the normal control function, as the control function. The normal control function is selected when it has been detected that the grid is operating stably and the support control function is selected when a grid problem, grid fault or an end of the grid fault has been detected. The support control function controls the fed-in power to counteract an oscillation in the grid.

19 Claims, 7 Drawing Sheets

(51) Int. Cl.
*H02J 3/00* (2006.01)
*H02J 3/46* (2006.01)
(52) U.S. Cl.
CPC ....... *H02J 2300/24* (2020.01); *H02J 2300/28* (2020.01)

(56) References Cited

U.S. PATENT DOCUMENTS

2015/0198145 A1* 7/2015 Diedrichs ............... F03D 9/257
 700/287
2016/0336888 A1* 11/2016 Busker ...................... H02J 3/24
2017/0250540 A1* 8/2017 Varma ..................... H02M 7/44

OTHER PUBLICATIONS

U.S. Appl. No. 16/963,768, filed Jul. 21, 2020, Method for Feeding Electrical Power Into an Electrical Supply Network.

* cited by examiner

METHOD FOR FEEDING ELECTRICAL POWER INTO AN ELECTRICAL SUPPLY NETWORK

BACKGROUND

Technical Field

The present invention relates to a method for feeding electric power into an electricity supply grid. The present invention also relates to a corresponding wind power installation.

Description of the Related Art

It is known to use a wind power installation to feed electric power into an electricity supply grid. The wind power installation is usually targeted to a grid frequency in the electricity supply grid, and the same also applies in principle to a wind farm having a plurality of wind power installations. Such a grid frequency is usually predefined and supported by large-scale power plants. Such large-scale power plants have directly coupled synchronous generators for this purpose. This means that these synchronous generators, or at least one of them, are electrically connected directly to the electricity supply grid. The frequency in the electricity supply grid then results directly from the rotational speed of the synchronous generator.

In this respect, these generators, which have a large moment of inertia, may predefine a comparatively stable grid frequency. If however a voltage dip occurs in the grid, specifically in the event of a grid fault, these directly coupled synchronous generators may thereby start to oscillate. Such a voltage dip may in particular cause a phase jump. Following the voltage dip, the average pole wheel angle may then shift forward since the machine, that is to say the synchronous generator, was not able to deliver the full active power into the grid during the voltage dip. In principle, however, other faults may also lead to such unwanted excitation or other unwanted excitation of the directly coupled synchronous generators.

Such directly coupled synchronous generators, which may also be referred to as synchronous machines, may also be put into oscillation by a sudden parallel infeed of active power, since the operating characteristic curve of the synchronous generator suddenly changes accordingly due to such a sudden parallel infeed of active power. If such excess energy is not dissipated quickly enough again at the synchronous generator, the synchronous generator may possibly not return, or not return quickly enough, to its normal operating state. There is also the risk of said different oscillatory excitations overlapping to such an extent that they disrupt the synchronous generator.

Such behavior of a synchronous generator or of a plurality of synchronous generators correspondingly coupled directly to the electricity supply grid is also noticeable in the grid, for example in the form of frequency oscillations. In the most extreme case, the synchronous generator being disrupted may also lead to breakdown of the electricity supply grid when such a situation is not able to be absorbed by a sufficient number of other generators in the electricity supply grid.

Decentralized generators, such as for example wind power installations, may also in this case contribute to stabilizing the electricity supply grid. Such decentralized generators, which feed into the electricity supply grid by way of a frequency converter, be this then directly through a full converter concept or using a doubly fed asynchronous machine, are usually able to respond immediately to grid problems and for example, in the case of a frequency drop, feed additional power into the electricity supply grid at least in the short term. As a result, such decentralized generators, for which wind power installations are mentioned below by way of representation, are able to achieve rapid grid support. Such grid support may turn out to be all the more effective the more wind power installations or other decentralized generators feed into the electricity supply grid.

At the same time, however, there is the inherent risk of specifically such rapidly fed-in supportive power also possibly causing oscillatory excitation of a directly coupled synchronous generator. In the most extreme case, such an infeed of active power, depending on the boundary conditions, could even lead to disruption of such a synchronous generator. However, even without such an extreme consequence, oscillatory excitation of a synchronous generator by decentralized generators is undesirable.

The German Patent and Trademark Office has searched the following prior art in the priority application relating to the present application: DE 10 2016 115 431 A1, US 2012/0292904 A1 and the article "Damping control of PMSG-based wind turbines for power system stability enhancement" by Yuan Fu et al.

BRIEF SUMMARY

Oscillatory excitation of a synchronous generator, in particular following a grid fault, is avoided or is even reduced or additionally reduced when it occurs.

A method is proposed. This method accordingly feeds electric power into an electricity supply grid and the supply grid has a grid frequency. Feeding in takes place by way of a converter-controlled generation unit at a grid connection point. Electric power is in particular fed in by way of a wind power installation. The infeed of electric power may also be referred to here as an exchange of electric power because, during the infeed, it also comes into consideration to at least briefly draw electric power from the grid, specifically for support tasks. The infeed of electric power should in this respect not be understood to be restricted such that feeding in is always and only performed, but rather it may also include a reversal of the power flow direction, specifically from the electricity supply grid to the decentralized generation unit, that is to say for example to the wind power installation.

In any case, electric power is fed into the electricity supply grid depending on a control function. The electric power may comprise both active and reactive power here. The control function controls the power that is fed in depending on at least one state variable of the electricity supply grid. The grid frequency in particular comes into consideration here as state variable. It is however also possible to take into account, possibly additionally, a grid voltage.

To this end, it is also proposed for it to be possible to select between a normal control function and a support control function as control function. The support control function in this case differs from the normal control function. The normal control function is selected when it has been recognized that the electricity supply grid is operating essentially stably. This means in particular that no grid fault is present. A stably operating electricity supply grid however also includes a situation if for example frequency fluctuations or voltage fluctuations occur, as long as these however remain within defined or definable limits. The normal control function may for example increase or decrease the infeed of active power in proportion to a deviation in the grid frequency from a frequency reference value. It also comes into consideration for example for the normal control function to feed in a reactive power component depending on the grid voltage, that is to say to change a reactive power infeed in particular on the basis of an increase or decrease in the grid voltage.

The support control function is selected when a grid problem, grid fault or an end of the grid fault has been recognized. Such a grid problem, or such a grid fault, are in particular grid disruptions, such as a brief voltage dip due to a grid short circuit. Such a grid short circuit may be of very short duration, such as for example a few milliseconds or a few hundredths of a second. Such a grid problem or such a grid fault are thus detected in particular as transient processes in which an essentially sinusoidal signal is no longer able to be assumed. Following the end of such a grid fault, however, a sinusoidal signal may quickly be present again. Such a grid problem or grid fault may be detected for example by way of a voltage dip, including for example less than 50 percent of a nominal grid voltage, which also includes a voltage drop down to 0.

The support control function, if this is selected, then controls the fed-in power such that it is possible to counteract an oscillation in the electricity supply grid. In particular an oscillation of a synchronous generator connected to the electricity supply grid or an oscillation caused by the synchronous generator. This support control function is therefore specifically tailored to such synchronous generator behavior. In particular, such a support control function may identify specific behavior patterns and respond accordingly. It may in particular feed in power in such a way that it specifically does not support oscillation, which could possibly take place with the normal control function.

It has thus been recognized that it may sometimes not be sufficient to generally support the grid with the normal control function, but rather that this could under some circumstances even further worsen the situation in the event of a grid fault. It is accordingly proposed, in such a fault case, to then select the support control function that is specifically tailored to avoiding synchronous generator oscillation and in particular to reducing or damping such synchronous generator oscillation.

According to one embodiment, it is proposed to counteract an oscillation that is caused by a response of at least one synchronous generator coupled directly to the electricity supply grid to the grid problem, the grid fault or the end of the grid fault. It is thus proposed here to respond specifically to a response of a synchronous generator. In this case, an oscillation that is preferably recorded through measurement is specifically counteracted here. Such an oscillation may be particularly characteristic of the synchronous generator that causes it. In particular, such an oscillation may occur in a frequency analysis of the grid frequency as a prominent value, known as a peak, at a specific frequency. Such a specific frequency may be in the range from 0.1 Hz to 10 Hz, and it may in particular be expected in a range from 0.5 to around 3 Hz.

The grid frequency as such would thus, inter alia, itself oscillate at such a frequency, wherein further weaker oscillations of the grid frequency may be overlaid. To choose a simple plastic example, the fact that the grid frequency itself oscillates at a certain frequency may for example mean that it increases from 49.5 Hz to 50.5 Hz at a nominal frequency of 50 Hz and drops back again to 49.5 Hz in one second, this repeating cyclically. In this very simple example, the grid frequency would then oscillate at a frequency of 1 Hz and in the process with an amplitude of 0.5 Hz. This is only an illustrative example, and the frequency of 1 Hz selected by way of example would characterize the synchronous generator here. However, it may also for example be a frequency of 1.38 Hz, to give another arbitrary illustrative example. This is intended to make it clear that this oscillation frequency, if it has a significant amplitude, may characterize the synchronous generator. From this characterizing frequency alone, when such an oscillation occurs, it is then able to be recognized whether it may be assigned to a known synchronous generator in the electricity supply grid. Even if such a frequency was not previously known, a dominant value of an oscillation recognized in said frequency range may be sufficient to identify the oscillation of a synchronous generator.

The support control function proposed according to one embodiment then responds to such an oscillation. It thus recognizes this oscillation, responds to it and counteracts it accordingly. In slightly simpler form, this may mean that the support control function is used to feed power into the electricity supply grid in an anti-cyclical manner with respect to the synchronous generator.

Such an oscillation of a synchronous generator should however, according to this embodiment, be counteracted in particular when the oscillation is due to a grid problem or grid fault. The end of a grid fault may in particular also cause such an oscillation to a considerable extent. The characteristic oscillation, mentioned by way of example, of such a synchronous generator may in principle always be present, but with different amplitudes. In the normal case, a low amplitude may be assumed, this possibly being detectable but not critical. However, if such a grid fault or the end of such a grid fault occurs, said oscillation of the synchronous generator may be excited with considerable amplitude. The oscillation as a response of the synchronous generator to the grid problem, the grid fault or the end of the grid fault may thus already be recognized in the amplitude. In addition, however, the converter-controlled generator unit itself also identifies this grid problem, this grid fault or the end thereof, because such a converter-controlled generation unit, in particular a wind power installation, has to monitor such events in the grid in any case. If such a characteristic oscillation of a synchronous generator thus occurs when such a grid problem or such a grid fault or the end thereof occurs, there is an oscillation that forms a response of the synchronous generator to the grid problem, the grid fault or the end of the grid fault.

Purely by way of precaution, it is pointed out that this may also apply to a plurality of synchronous generators, wherein this essentially relates to the case in which a large-scale power plant uses a plurality of identical synchronous generators, which therefore have the same characteristic oscillation frequency and are accordingly also excited synchronously by the same grid fault.

Here too, this is in particular based on the finding that such an oscillation may be specifically identified and specifically responded to. Such a specific response to a specific oscillation of such a synchronous generator may be significantly different from a conventional response to a grid event required by a converter-controlled generation unit. Compared to the normal control function, this support control function may thus calm such an oscillation of a synchronous generator in a dedicated manner, or at least respond thereto in a targeted manner.

According to one embodiment, it is proposed for it to be recorded whether at least one synchronous generator relevant in terms of oscillation to the grid connection point is coupled to the electricity supply grid. In this case, a synchronous generator relevant in terms of oscillation to the grid connection point should be understood as one that is arranged and connected electrically at the grid connection point and/or acts to such a great extent on the grid connection point that a generator oscillation of the electrical synchronous generator, in which the synchronous generator oscillates around an operating point, is able to be measured at the grid connection point. It is in particular taken as a basis here that the generator oscillation is able to be measured as a frequency fluctuation or as a voltage fluctuation. This in particular involves recording in advance, that is to say recording before a grid problem or grid fault occurs. It is thereby able to be assessed beforehand whether and if so how a support control function is required. Such a support control function may preferably also be prepared, in particular parameterized, with knowledge of such a recorded synchronous generator that is relevant in terms of oscillation.

According to one embodiment, it is proposed for a frequency gradient to be recorded in the electricity supply grid, in particular at the grid connection point. To this end, it is furthermore proposed, immediately following the grid problem, grid fault or end of the grid fault, for an active power infeed to be resumed by the converter-controlled generation unit, in which the active power infeed is increased with time. The active power infeed may thus be increased for example at least initially along a ramp or other function. To this end, it is then proposed for the active power infeed to be increased depending on the recorded frequency gradient and for the active power infeed to in this case be increased more slowly in the case of a positive frequency gradient than in the case of a negative frequency gradient. The control is performed in this case such that the active power is increased in any case, but the type or speed of the increase depends on the recorded frequency gradient. By way of example, to take up the above example again, the fed-in active power may be increased along a time-dependent ramp, wherein these increases and decreases are overlaid, specifically with increases in the case of negative frequency gradients and decreases in the case of positive frequency gradients. More precisely, such a ramp would have thus elevations or depressions depending on the frequency gradients. This ramp would in particular however head toward the same final value as without elevations and depressions.

It is in particular proposed for the increase in the active power infeed to be controlled depending on the recorded frequency gradients such that the increase is decelerated with increasing frequency gradients and accelerated with decreasing frequency gradients. Accordingly, there would be an increase in active power in any case, which is however weakened in the case of increasing frequency gradients and amplified in the case of decreasing frequency gradients. An increase using a ramp function in particular comes into consideration, wherein an oscillating signal dependent on the frequency gradient is overlaid on the ramp. Such an overlapping signal may also be referred to as an overlaid signal. In particular in the case of a sinusoidally changing frequency gradient, this may result in a sinusoidal overlaid signal that is overlaid on the ramp. This increase in the active power infeed depending on the frequency gradient in particular considers instantaneous values of the frequency gradient.

As a further possibility, it is proposed to increase the active power infeed depending on a peak value of an oscillating frequency gradient. Like the other approaches, this approach is based on an oscillating frequency, which also leads to an oscillating frequency gradient. In particular in the case of a sinusoidal oscillation, that is to say vibration, of the frequency, the frequency gradient is also sinusoidal. To this end, but also if the oscillation of the frequency gradient should not be sinusoidal, it is then proposed to consider the peak value. Not every instantaneous value is in particular considered. A function that envelops the profile of the frequency gradient may preferably also be considered, or the function of one of two enveloping curves. A function of the peak value of the oscillating frequency gradient is not itself oscillating and this is exactly what is also proposed here, specifically for the increase in the active power infeed not to be oscillating, but rather in particular to be monotonically rising. Such a monotonically rising increase in the active power infeed then leads to an active power infeed that may adopt a profile along a curve with upward curvature over time. The active power is thus not increased along a linear ramp, but rather only weakly at first and then increased to a greater extent. The precise profile then depends on the recorded frequency gradient.

It is therefore in particular also proposed, when the peak value is reduced with a decreasing frequency oscillation, for the increase in the active power infeed to be increased. The more the frequency oscillates, the less the active power is thus increased following the grid problem, grid fault or end of the grid fault. The more the oscillation has calmed, the more the active power may then be increased.

Said options for increasing the active power infeed following the grid problem, grid fault or end of the grid fault may preferably also be combined. Increasing the active power infeed depending on the peak value of the frequency gradient may in particular be combined with the fact that the increase in the active power infeed depending on the recorded frequency gradient is controlled such that the increase is decelerated with an increasing frequency gradient and accelerated with a decreasing frequency gradient. With this type of increase, which is based in particular on the instantaneous value of the frequency gradient, the change in the active power infeed may itself also oscillate. This change, which may itself also oscillate, may not only be overlaid on a ramp function, but may instead be overlaid on a described, non-oscillating increase that is controlled depending on the peak value. This increase controlled depending on the peak value may thereby receive an oscillating component, specifically by overlaying an increase depending on instantaneous values of the frequency gradient.

According to a further embodiment, it is proposed for reactive power to be fed in immediately following the grid problem, grid fault or end of the grid fault. To this end, it is proposed for a reactive power function to be used to feed in the reactive power, which function specifies a relationship between a recorded voltage and reactive power to be fed in, wherein it is possible to select between a first and a second reactive power function. The reactive power function thus specifies the reactive power to be fed in, and this specification takes place depending on a recorded voltage. In this case, the grid voltage comes into consideration in particular as recorded voltage, in particular at the grid connection point at which the converter-controlled generation unit feeds into the electricity supply grid. An equivalent variable may however also be recorded.

To this end, it is then proposed for it to be possible to select between a first and a second reactive power function. The first reactive power function is in this case selected when it has been recognized that the electricity supply grid is operating stably. Here too, this means that slight deviations from an optimum point in the electricity supply grid may be present, in particular with regard to voltage and frequency, but these are not serious, and in particular do not yet indicate instability or a grid fault.

The second reactive control function is selected if a generator oscillation of a synchronous generator relevant in terms of oscillation to the grid connection point has been recorded, or if such a generator oscillation should be expected. It has already been explained above how such a generator oscillation may be recorded. This should in particular be expected if it is known that a corresponding synchronous generator is connected to the electricity supply grid and a disruption that excites oscillation, that is to say in particular a grid problem or grid fault or end of such a grid fault, has been detected. In such cases, the second reactive power function is then thus selected, which may thus take into account this expected or existing oscillation problem of a synchronous generator in a targeted manner via a reactive power infeed.

In this case, there is provision for the second reactive power function to have a larger gain in terms of magnitude than the first one, specifically the gain between the recorded voltage and the reactive power to be fed in. In the simplest case, this may be a constant factor that differs between the first and second reactive power function. This may however also mean that, for example, a voltage-dependent gain is provided, that is to say a changeable voltage, which is however still different in each case at the same voltage in the comparison between the first and second reactive power function, specifically greater for the second reactive power function. As a result, this reactive power infeed may in particular be used to achieve a higher stability in the grid, in particular a higher voltage stability, which may counteract the oscillation of the synchronous generator. Voltage limits must in this case be complied with. It has been recognized that a higher pole wheel stability is achieved through the reactive power infeed or the additional stator-side magnetization of the generators. To this end, however, it is proposed for there to be voltage limits, and it is proposed to perform control such that a voltage is not permanently pushed out of the permitted voltage range.

The reactive power infeed may result in additional stator-side magnetization of the generators, and a higher pole wheel stability is thereby able to be achieved. To this end, it is proposed to observe voltage limits in order to avoid a situation whereby an output voltage of the inverter that is used does not permanently leave a predefined voltage range.

There is preferably provision for the normal control function to be or to comprise the first reactive power function and for the support control function to be or to comprise the second reactive power function. What is preferably proposed is a reactive power function that leads to a reactive power infeed that temporarily allows a higher grid voltage. The second reactive power function thus corresponds to the support control function or forms part thereof and is preferably also selected if a grid problem, grid fault or an end of the grid fault has been recognized. This is seen as an indicator that an oscillation should be expected. To this end, it is preferably proposed for the reactive power function to be selected at least temporarily to be large enough that a higher grid voltage is temporarily permitted, in particular above a nominal grid voltage, in particular at least 10% above the nominal grid voltage.

According to one embodiment, it is proposed for the control function, in particular the support control function, to implement a behavior of a virtual synchronous machine with an inertia with a predefinable moment of inertia. The behavior of the virtual synchronous machine is in this case implemented at least to the extent that an increase or decrease in the grid frequency leads to a decrease or increase in the fed-in active power. To this end, it is proposed for the decrease or increase to be greater the greater the predefined moment of inertia. It is in particular proposed to implement the behavior such that the decrease or increase is proportional to the predefined moment of inertia. If a certain increase or decrease in the grid frequency thus leads to a certain decrease or increase in the active power fed in according to this behavior, this turns out to be twice as large if the moment of inertia is twice as large.

In addition or as an alternative, it is proposed for a fed-in infeed current to lag or lead the grid voltage when the grid frequency increases or decreases, and for the infeed current to lag or lead more the greater the predefined moment of inertia.

A virtual synchronous machine is therefore used here as a basis for said functions. This should be understood as meaning that this virtual synchronous machine is coupled directly to the electricity supply grid into which the power in question is to be fed. As a result, it may in principle be assumed that this virtual synchronous machine rotates at a speed corresponding to the grid frequency, but was not previously excited to oscillate by the grid event. A specific factor between speed and grid frequency is not essential here, but for the sake of simplicity it may be assumed, as a preferred embodiment, that the synchronous machine, or its rotor, rotates at 50 rev/s at a grid frequency of 50 Hz. Analogously, it rotates at 60 rev/s at a grid frequency of 60 Hz.

In generator operation, the pole wheel angle leads the voltage. If the grid frequency then increases, the pole wheel angle first of all decreases, meaning that the synchronous machine thereby feeds in less. Such described behavior, which of course also applies analogously to the decrease in the grid frequency, is thus implemented in the control function. The control function thus behaves depending on a change in the grid frequency in the manner described.

In addition or as an alternative, it is therefore also proposed for a behavior to be implemented in which a fed-in infeed current lags the grid voltage when the grid frequency increases or leads it when the grid frequency decreases. It is also proposed to implement this behavior as part of the behavior of a virtual synchronous machine.

The predefinable moment of inertia of such a virtual synchronous machine determines its dynamics and thus also the behavior as to how the power increases or decreases or how the infeed current lags or leads. It is therefore also proposed to implement this predefinable moment of inertia as part of the behavior of the virtual synchronous machine. To this end, it is proposed for this predefinable moment of inertia, which in this respect represents a virtual moment of inertia, to be able to be changed or set as desired.

It is preferably proposed for the behavior of the virtual synchronous machine to be activated immediately following the grid problem, grid fault or end of the grid fault, that is to say for an oscillation-free machine to be connected virtually to the grid and, in addition or as an alternative, for the moment of inertia to be increased. The fact that the virtual synchronous machine is activated basically means that an oscillation-free machine is connected virtually to the grid. The grid problem, the grid fault or the end thereof thus triggers activation of the behavior of the virtual synchronous machine in order thereby to specifically activate an infeed behavior for damping oscillations of a synchronous generator that should then be expected. In addition, the moment of inertia may for this purpose be increased in order to further boost the effect. If a behavior of the virtual synchronous machine is already still active, it also comes into consideration to increase the moment of inertia following the grid problem, grid fault or end of the grid fault. This increases the effectiveness of this type of control.

All of these measures, which are proposed immediately following the grid problem, grid fault or end of the grid fault, may instead or in addition also be performed if oscillation of the grid frequency is recorded. In this case, it is in particular proposed to activate the measures when the oscillating frequency passes through a pre-fault grid frequency. A pre-fault grid frequency is a grid frequency that was recorded immediately before the grid problem or grid fault occurred. It is thus assumed here that an oscillation in the grid frequency has been recorded. This thus oscillates around a fixed frequency, in particular around a frequency that was recorded immediately before the grid problem or grid fault occurred. The grid frequency then thus oscillates around this pre-fault grid frequency and it is proposed to perform said measures when this oscillating frequency passes through the pre-fault grid frequency, that is to say basically precisely when the oscillating frequency has the value of the pre-fault grid frequency. When the oscillating frequency passes through the pre-fault grid frequency in this way, the behavior of the virtual synchronous machine is thus activated and, in addition or as an alternative, the moment of inertia, that is to say the virtual moment of inertia, is increased. The oscillation is thereby in particular able to be counteracted in a targeted manner.

According to a further refinement, it is proposed to implement damping control for active oscillation damping in the support control function. This also includes in particular also designing the functions already described above such that they have a damping effect, that is to say parameterizing them accordingly. In particular in the case of linear support control functions, these may be characterized using eigenvalues and the eigenvalues may be set such that a damping effect is brought about or the eigenvalues for the overall system with the support control function may be selected accordingly by selecting the support control function.

In addition or as an alternative, according to one embodiment, it is proposed, in order to feed in electric power, for a fed-in or drawn reactive power to be modulated by modulating the converter-controlled generation unit as an admittance ($Y_L$). The control therefore works in such a way that it feeds in a current that would result if the generation unit were to be a corresponding admittance. The generation unit is thereby modulated as an admittance. Since an admittance consists of a conductance and a susceptance, a damping component may also be achieved by predefining the admittance accordingly.

According to one simple implementation, it also comes into consideration for example to provide a differentiating component in the support control function that has a regular damping effect, provided that it is of course parameterized accordingly.

A simulation or emulation of a series resistance is preferably proposed in order to implement such damping control. Such a series resistance may for example be simulated or emulated in such a way that it behaves similarly to a grid choke. A damping effect is thereby able to be achieved via the fed-in current.

This is based on the concept that the effect of the fed-in current occurs at the series resistance through this simulation or emulation of this series resistance, in particular that a corresponding voltage is established there and this or its effect on the infeed is taken into account accordingly. By way of example, if an oscillation is present, a correspondingly oscillating voltage also occurs across the series resistance due to the fed-in current, which may in turn have a corresponding influence on the fed-in current. To this end, it is proposed not to use an actual series resistance, but rather to simulate or to emulate it. These two variants are used synonymously here since the fed-in current is channeled through the series resistance in a kind of simulation, which series resistance in turn is only available as a calculation variable. In this respect, a simulation is present. On the other hand, however, the series resistance is also emulated since it is implemented in the overall behavior, for example in the support control function, that is to say is taken into account in the manner of a calculation variable such that it acts like a series resistance there. In this respect, an emulation is then present.

In addition or as an alternative, it is proposed to simulate or to emulate a frequency-dependent load. A principle similar to that described for the series resistance applies here. In contrast thereto, such a frequency-dependent load is however not arranged in one current path or in all of the current paths, but rather is connected in the manner of a load. This behavior is then simulated or emulated, thereby influencing the infeed so as to counteract the oscillation.

According to one embodiment, a cubic power-voltage characteristic is proposed for this purpose. Such an underlying characteristic accordingly responds to a change in voltage with a power that increases in a cubic relationship thereto. In the simplest case, which is intended to serve here in particular as an illustrative explanation, a doubling of the voltage is responded to with an eightfold increase in the power. Such a load is thus simulated or emulated. This proposal in particular targets the behavior of a thermistor that has a negative temperature coefficient, in which its ohmic resistance thus decreases with rising temperature. If the voltage thus increases, the current increases as a result, causing the resistance to heat up and thereby decrease, which leads to a further current rise. The voltage increase is thereby incorporated three times in the power increase. A particularly effective damping behavior is thereby able to be achieved, which has less of an effect on small changes in voltage and more of an effect on larger changes in voltage.

According to one embodiment, it is proposed for the support control function to be selected and/or parameterized depending on a converter saturation. The converter saturation is in this case a measure of the proportion of fed-in power that was fed in by converter-controlled feeders to overall power fed into the electricity supply grid. The overall power fed into the electricity supply grid is in this case essentially the sum of the power fed in by converter-controlled feeders and the power fed in by synchronous machines coupled directly to the electricity supply grid. It has been recognized here that the converter saturation, that is to say the proportion of converter-controlled feeders in the electricity supply grid, may both have an influence on how effective a support control function may be, but on the other hand it may also be used to assess how critical or dominant an oscillating synchronous generator or a plurality of oscillating synchronous generators may be for the electricity supply grid.

It is preferably proposed for the support control function to comprise a damping measure or a damping component and in particular for the support control function to correspond to the normal control function with the added damping measure. The infeed is thus essentially still based on the normal control function, even if the support control function is selected, but only adds a damping measure thereto. To this end, damping measures in particular described above come into consideration, such as for example a D component or a corresponding setting of the eigenvalues of the overall transfer function of the controlled system.

When an oscillation of at least one synchronous machine is recorded in the electricity supply grid, a rapid active power recovery is preferably performed, in particular a faster active power recovery than would be predefined by the support control function if a high converter proportion, in particular of at least 90%, in particular at least 95%, was recorded, wherein in particular a disruption of a synchronous machine coupled directly to the grid is then accepted.

This is based on the finding that, in the case of a very high converter proportion, this is also dominant for the electricity supply grid. In this case, it is proposed for a fast power recovery to take priority over targeted oscillation stabilization of a synchronous generator in the grid, or even a plurality of synchronous generators in the grid. This is based on the concept that such a fast power recovery would be preferable even if there were to be a risk of a synchronous generator coupled directly to the electricity supply grid being disrupted, that is to say in particular exceeding a breakdown torque and then having to be synchronized again. It is pointed out at this juncture that a synchronous generator or synchronous machine coupled directly to the electricity supply grid is also referred to simply as a synchronous generator or synchronous machine in the grid or in the electricity supply grid.

This measure specifically allows rapid grid stabilization to be achieved; further active power required in the grid may in particular be provided quickly in order thereby to avoid other problems in the electricity supply grid.

The situation is different when the converter proportion in the grid is lower, in particular 50% or less. The goal of being able to provide active power in the electricity supply grid as quickly as possible following a fault is then usually best able to be achieved together with the directly coupled synchronous generators. It is then thus advantageous for the converter-controlled generator units to initially or at least additionally to concentrate on making the one or more synchronous generators coupled directly to the electricity supply grid operate stably.

For this reason, testing for the converter proportion is proposed as a method step. As an alternative, instead of the ratio of the powers currently being fed in, a ratio of powers able to be fed into the electricity supply grid, in particular including a ratio of only the nominal power, may also be taken into account as the converter component. As a result, a stable and permanent calculation parameter is available and may easily be taken into account. It may in particular be recognized in advance whether or not there is a high converter proportion. In the worst-case scenario, the correct control function may accordingly be used immediately in response. As an alternative, it comes into consideration here to take into account a ratio of the nominal powers, but to make a corresponding modification depending on the specific situation, that is to say for example the wind supply, if the converter-controlled generation units are wind power installations.

A converter-controlled generation unit (generator) is provided. What is in particular proposed is a wind power installation that operates as a converter-controlled generation unit. Such a converter-controlled generation unit is used to feed electric power into an electricity supply grid, wherein the supply grid has a grid frequency. This generation unit has an infeed apparatus for feeding in electric power depending on a control function, wherein the electric power may comprise active and reactive power. Such an infeed apparatus may in particular be or at least comprise an inverter or a plurality of inverters connected in parallel.

What is furthermore provided is a controller in which the control function is implemented. The control function is in this case designed and implemented such that it controls the power depending on at least one state variable of the electricity supply grid. It thus controls the feeding of the electric power into the electricity supply grid. Grid voltage and grid frequency come into particular consideration as state variables.

What is furthermore provided is a selection apparatus in which it is possible to select between a normal control function and a support control function, different from the normal control function, as control function. The selection apparatus is also designed to make an appropriate selection. It is in this case designed, in particular a corresponding selection criterion is implemented, such that the normal control function is selected when it has been recognized that the electricity supply grid is operating stably. This also includes the possibility that the grid deviates from an optimal operating point. The support control function is selected when a grid problem, grid fault or an end of the grid fault has been recognized. What is accordingly also preferably proposed is a recording unit (e.g., controller) for recording the grid fault.

The support control function in this case controls the fed-in power such that it is possible to counteract an oscillation in the electricity supply grid, and the intention is in particular to counteract an oscillation of a synchronous generator connected to the electricity supply grid or an oscillation caused by the synchronous generator.

The advantages for the proposed converter-controlled generation unit or the wind power installation result from the explanations regarding the above-described embodiments of the method for feeding electric power into the electricity supply grid.

It is therefore preferably also proposed for the converter-controlled generation unit or the wind power installation to use a method according to at least one of the above-described embodiments. In particular, such a method is implemented in each case in the converter-controlled generation unit or in the wind power installation, in particular in the controller.

A wind farm having a plurality of wind power installations is provided. It is proposed in this case for a plurality of wind power installations to be used according to at least one embodiment described above. The wind farm then thus has a plurality of wind power installations, each of which selects a support control function for itself in each case in particular between a normal control function. In particular, a method described above in accordance with at least one embodiment is implemented in each individual wind power installation.

In addition or as an alternative, it also however comes into consideration for the wind farm to have a farm control unit (controller), which may also be referred to as a central farm control unit, and which uses at least one method according to an embodiment described above, in particular has implemented such a method. To this end, it is proposed for such a farm control unit to generate power setpoint values based on this method and to forward them to the wind power installations in the wind farm. The wind power installation then only implements the corresponding power setpoint values. As an alternative, the wind farm may provide a central farm infeed unit (inverter) that takes over the infeed for all of the wind power installations in the farm. By way of example, such a central infeed unit may be connected to all of the wind power installations in the farm via a DC current in the grid and thereby receive the power of the wind power installations in the farm. The central farm infeed unit may feed this power into the electricity supply grid and thus proceed as described in accordance with at least one embodiment of a method described above.

In particular by using a wind farm that uses at least one method described in an advantageous manner, it is possible to achieve grid support and here in particular vibration damping of at least one synchronous generator coupled to the electricity supply grid in a particularly efficient manner, since such a wind farm may also have an overall very high power supply and a controlling intervention may therefore be highly effective, especially with regard to changing the power infeed.

BRIEF DESCRIPTION OF THE SEVERAL VIEWS OF THE DRAWINGS

The invention is described in more detail below by way of example on the basis of embodiments with reference to the accompanying Figures.

DETAILED DESCRIPTION

Figure 1:
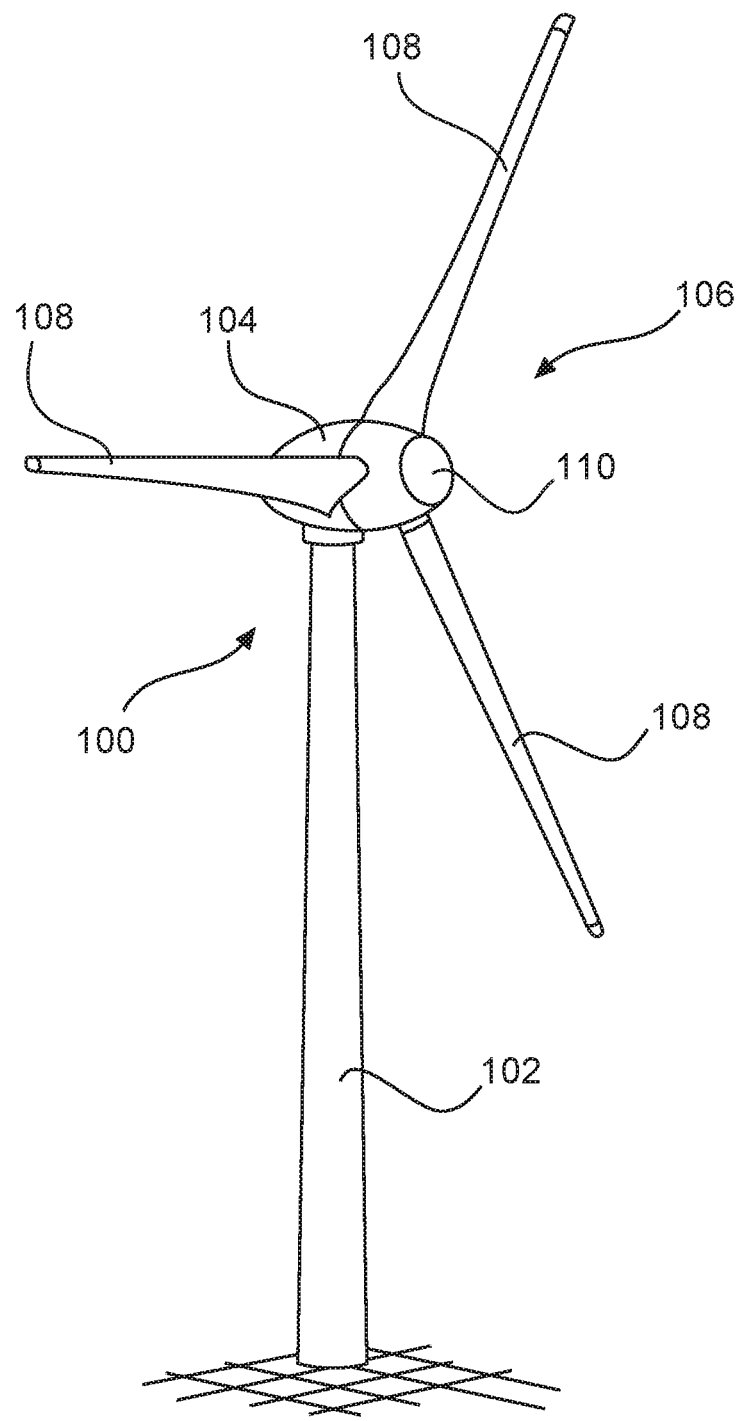
FIG. 1 shows a perspective illustration of a wind power installation.

FIG. 1 shows a wind power installation 100 with a tower 102 and a nacelle 104. Arranged on the nacelle 104 is a rotor 106 with three rotor blades 108 and a spinner 110. During operation, the rotor 106 is set in rotational motion by the wind and thereby drives a generator in the nacelle 104.

Figure 2:
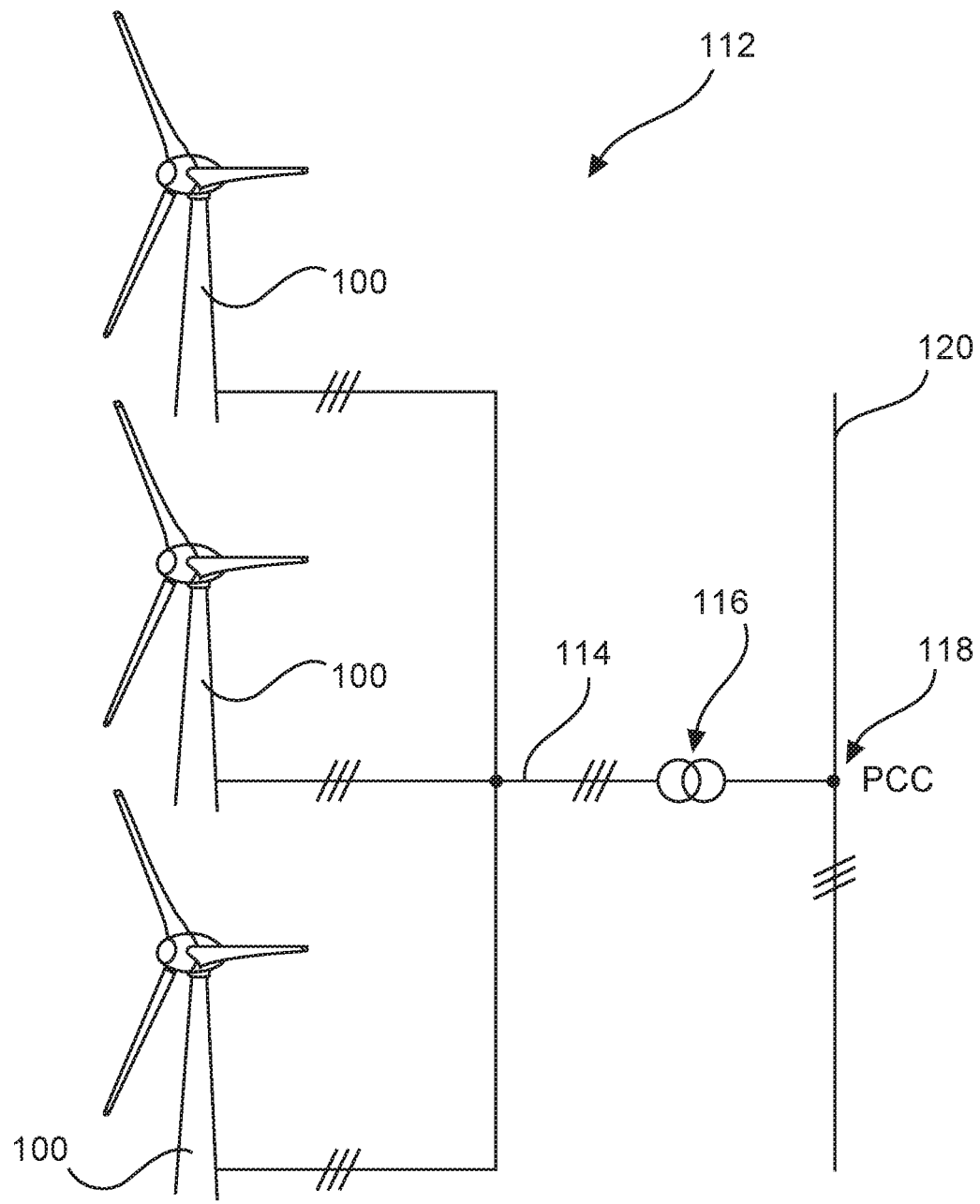
FIG. 2 shows a schematic illustration of a wind farm.

FIG. 2 shows a wind farm 112 having, by way of example, three wind power installations 100, which may be identical or different. The three wind power installations 100 are thus representative of basically any desired number of wind power installations of a wind farm 112. The wind power installations 100 provide their power, specifically in particular the generated current, via an electrical farm grid 114. In this case, the respectively generated currents or powers of the individual wind power installations 100 are added and a transformer 116 is usually provided, which steps up the voltage in the farm in order to then feed into the supply grid 120 at the infeed point 118, which is also generally referred to as PCC. FIG. 2 is only a simplified illustration of a wind farm 112, which does not show, for example, a control system, although a control system is present, of course. For example, the farm grid 114 may also be designed in another way by virtue of for example a transformer also being present at the output of each wind power installation 100, to mention just one other exemplary embodiment.

Figure 3:
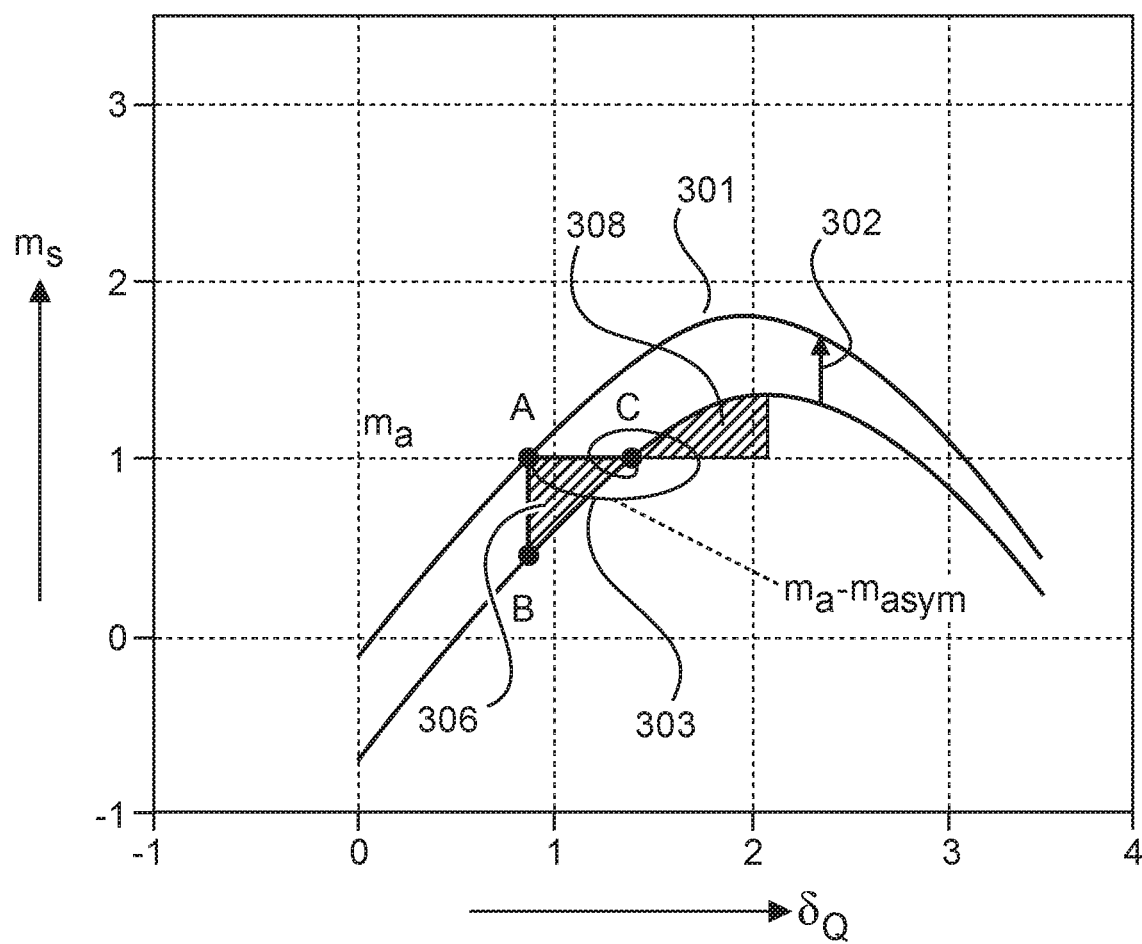
FIGS. 3 to 5 show graphs of possible behaviors of a synchronous machine in the vicinity of a converter-controlled generation unit.
Figure 4:
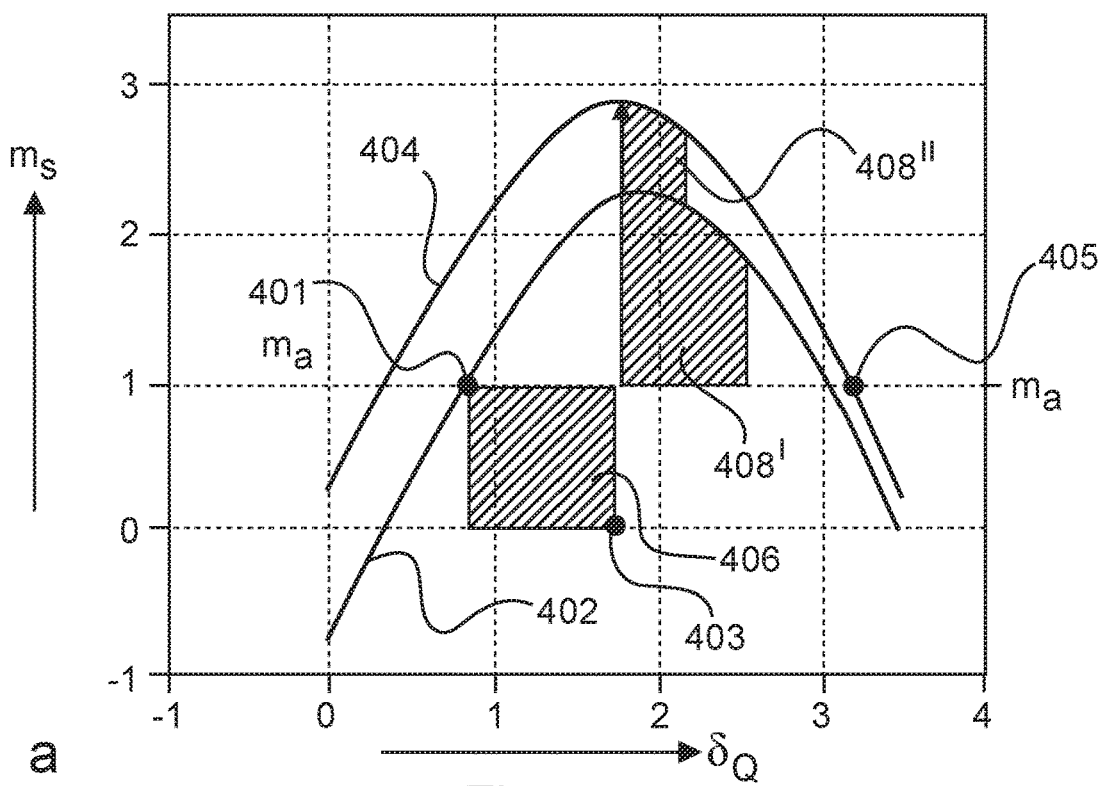
Figure 5:
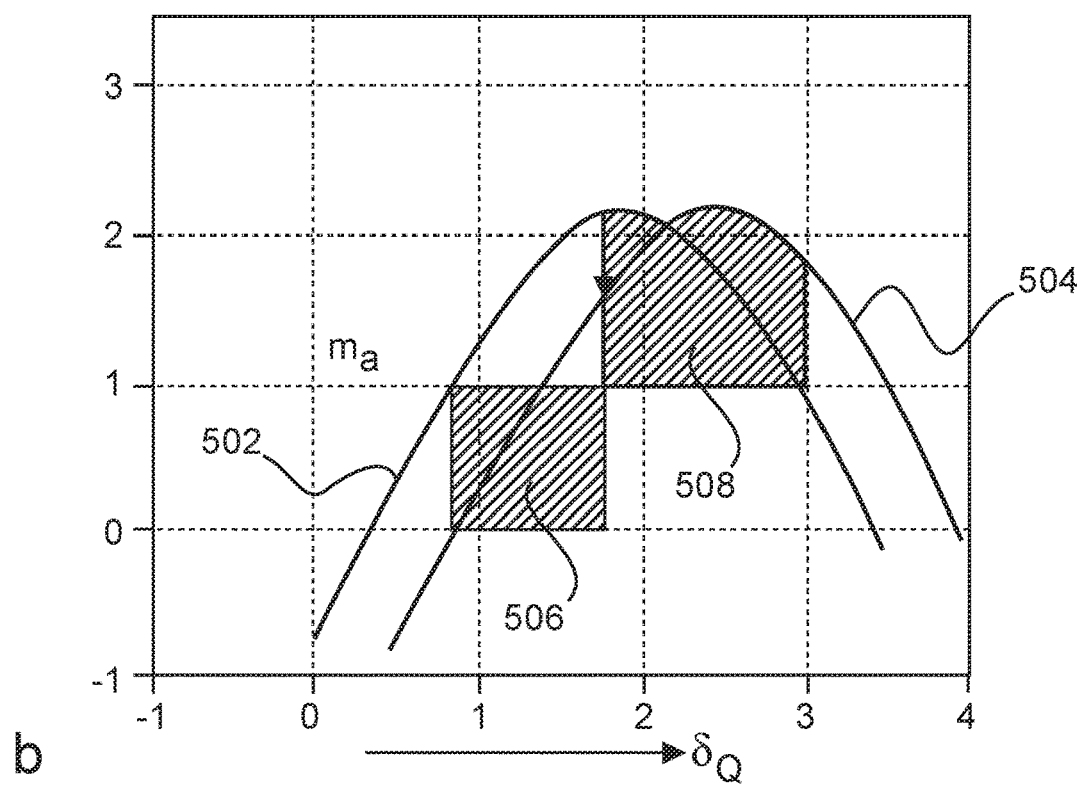

FIGS. 3 to 5 illustrate behaviors of a synchronous machine coupled directly to the electricity supply grid in the vicinity of a converter-controlled generation unit, in particular in the vicinity of a wind power installation or a wind farm. Different effects are illustrated in this case.

Basically, the problem has been recognized that synchronous generators or synchronous machines, which is used here as a synonym, in the event of a grid fault that leads to a voltage dip, may start oscillating, which may in particular be triggered by a phase jump. Following a voltage dip, the average pole wheel angle then shifts forward, since the machine was not able to deliver the full active power into the grid during the voltage dip.

Synchronous machines may also be set in oscillation by a sudden parallel infeed of active power, this being illustrated by FIG. 3. FIG. 3, and the same applies to FIGS. 4 and 5, shows operating characteristic curves of a synchronous machine, specifically the machine torque ms as a function of the pole wheel angle $\delta_Q$.

FIG. 3 illustrates the behavior of a synchronous machine that is operated in the vicinity of a converter-controlled generation unit in response to a rapid connection of a parallel infeed of active power, specifically in particular by a nearby converter-controlled generation unit. The operating characteristic curve 301 with the operating point A shows the situation prior to the rapid connection. As a result of the sudden parallel infeed of active power, this operating characteristic curve 301 suddenly changes to the new operating characteristic curve 302, and the new operating point B results initially, at least ideally, from the current pole wheel position. The drive torque, which is still constant, of a power plant is however not able to be absorbed by the synchronous generator at this operating point, giving rise to excess torque, and the pole wheel is accelerated according to this excess torque and the inertia of the entire rotor. When the pole wheel passes through the axis of the nominal torque, although the torques are still balanced, the kinetic energy in the rotor leads to the pole wheel passing through the characteristic curve, specifically the new operating characteristic curve 302. The pole wheel is in this case braked again by the higher torque. This excess energy should be dissipated again as quickly as possible so that the synchronous machine returns to a normal operating state again.

A possible recovery is illustrated by the transition section 303. In this case, operating point A transitions in a vibrating and thus oscillating manner to operating point C on the new characteristic curve 302. An acceleration surface 306 and a braking surface 308 are shown in order to clarify the problem. In the example that is shown, the situation is illustrated for a stable compensation procedure. The acceleration surface 306, that is to say essentially the triangle ABC, is in this case smaller than the possible braking surface 308. The movement is thus braked to a greater extent than it is accelerated, and the possible braking energy is thus greater than the acceleration energy. FIG. 3 illustrates the situation for a stable compensation procedure. The acceleration surface, that is to say essentially the triangle ABC, is in this case smaller than the possible braking surface, specifically the surface above the value for m=1 and to the right of point C.

It has now been recognized that it may be a problem when both said oscillatory excitations are overlaid to an excessive extent, since the synchronous machine could thereby be disrupted. This should be avoided. Such a case arises when the excitation, identified specifically by the acceleration surface 306, is greater than the braking, identified by the braking surface 308, that is to say when an excitation or surface equivalent thereto is greater than the possible braking surface.

To this end, it has also been recognized that this problem may occur in particular with a high saturation of converter-controlled generation units and should therefore in particular be taken into account in this case. Converter-controlled generation units may feed in such a power jump, which may thus constitute a risk. It has however also been recognized that converter-controlled generation units are able to be controlled in a targeted manner in order to avoid, to reduce or to solve the problem. By way of example, the transition section that is shown may be influenced and designed differently through such converter-controlled generation units.

One option proposed here for improving post-fault stability, that is to say for improving said problem, is that of recognizing the oscillatory behavior and responding appropriately thereto. To this end, it has in particular been recognized that excitation first takes place specifically due to the fault, and excitation may then occur again due to the effect that is explained in FIG. 3. Specifically, excitation first takes place that occurs due to the fault, and excitation then takes place again due to the effect that has been described in FIG. 3.

In this case, a distinction may be drawn between the following different strategies, which are proposed as embodiments.

One option is analyzing the frequency gradient df/dt. If df/dt>0, it is proposed to delay the active power recovery, whereas a rapid active power recovery is proposed for df/dt<0.

Depending on a frequency analysis or based thereon, it is proposed to improve the stability immediately following the fault through an active power recovery during the return oscillation of the pole wheel. This is illustrated in FIG. 4. Here, the operating characteristic curve 402 shows the situation following the rapid connection. If less active power is then fed in by the nearby converter-controlled generation unit during the return oscillation, this supports the active power recovery of the synchronous machine, since this leads to the operating characteristic curve 402 being increased to the increased operating characteristic curve 404.

The pole wheel of the synchronous generator whose oscillations are under consideration is accelerated further from the pre-fault state, that is to say from the starting point 401 during the fault, to an intermediate point 403 that is further to the right and below. One condition for a stable recovery is now that the surface of the acceleration surface 406 shown to the left of the intermediate point 403 is not larger than the original braking surface 408, which is located to the right and above the intermediate point 403, specifically below the original curve, that is to say below the operating characteristic curve 402.

The original braking surface 408', which is situated below the original curve 402, and the changed braking surface 409, likewise illustrated, which is situated under the shifted characteristic curve 404, are in this case of the same size. It however appears that the shifted curve 409 is at a greater distance from the tipping point 405 that is formed by the intersection of the curve with the torque ma. As a result of this greater distance, the shifted operating characteristic curve 404 has more stability reserves, this being able to be achieved by shifting the operating characteristic curve as described.

It has been recognized that it is also able to be recognized therefrom that the duration and the severity of the fault and thus the position of the pole wheel may under some circumstances be used as a support variable.

It should however be borne in mind that the pole wheel is accelerated from the pre-fault state, which is identified by the black dot 401, to a point further to the right and below (403) during the fault. One condition for a stable recovery is in this case that the surface to the left of the point 403 is not larger than the surface to the right and above the point 403, below the curve. The surface 408', which is situated below the old operating characteristic curve 402, and the surface 408", which is situated under the shifted operating characteristic curve 404, are in this case of the same size. It however appears that the surface 408" is at a greater distance from the tipping point that has the intersection of the curve with the torque ma than the surface 408' and therefore has more stability reserves.

Here too, it appears that the duration and the severity of the fault (and thus the "location" of the pole wheel) may under some circumstances be used as a support variable.

Stabilization through a forced infeed of reactive power is proposed as a further strategy. This is illustrated in FIG. 8C. Here, the operating characteristic curve 830 shows the situation following a rapid connection. The proposed forced infeed of reactive power by a nearby converter-controlled generation unit leads to the shift to the changed second operating characteristic curve 834. In this case too, the ratio of an acceleration surface to a braking surface is able to be improved. The acceleration surface results from the fault, and it fundamentally has to be smaller than the braking surface.

Although the effect of the infeed of reactive power is less than that brought about by the infeed of active power, it is possible to achieve an improvement in the damping of a synchronization procedure, that is to say a procedure in which the speed of the synchronous generator is synchronized back to the grid frequency, ideally to the grid nominal frequency, especially by modulating the reactive power, which may be achieved by modulating the admittance $Y_L$, specifically using power electronics of the wind farm 812 depending on the speed deviation.

According to one embodiment, it is proposed for the converter-controlled infeed apparatus, in particular the wind farm, to be equipped with at least one apparatus for feeding in a transverse voltage. This may be achieved using a FACTS device or a transverse transformer. A stability reserve of a synchronous machine is thereby able to be achieved through targeted shifting of the pole wheel angle. This is illustrated in FIG. 5, which shows a shift of the operating characteristic curve 502 to a shifted operating characteristic curve 504. In this case, a shift may have a stabilizing effect in both directions, depending on the size of the pole wheel angle. The acceleration surface 506 and the shifted braking surface 508 show that the stability reserve is increased by shifting the operating characteristic curve from 502 to 504.

The pole wheel angle of the synchronous machine may also be changed to a small extent through a targeted infeed of active and reactive power. In this case, it is not necessary to change active power and reactive power such that a shift according to FIG. 5 is exactly achieved. In this case, the effects of FIGS. 8B and 8C, which are explained in more detail further below, are overlaid. The effect is however far smaller than that of impressing a transverse voltage, for which reason it is also possible to use a modulation of the pole wheel angle again for stabilization purposes, in comparison with simply increasing the stability reserve.

One particular advantage of simply shifting the operating characteristic curve is the fact that the stabilizing measures may give rise to fewer effects on the voltage than in the case of the other proposed measures.

Figure 6:
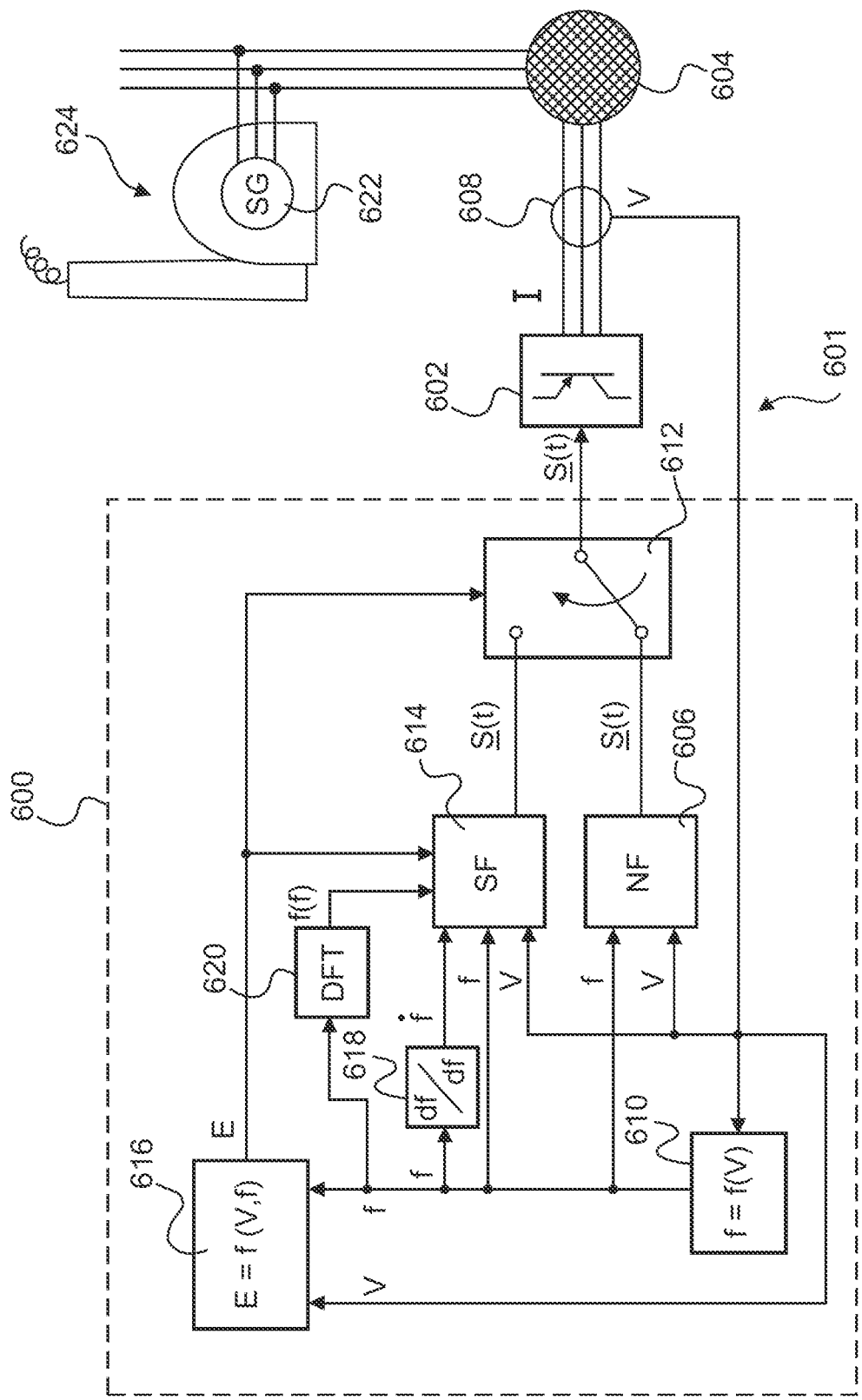
FIG. 6 schematically shows a structure of a controller with an infeed apparatus.

FIG. 6 schematically shows a controller 600 having an infeed apparatus 602 that feeds into an electricity supply grid 604. The infeed apparatus 602 in this case receives a power setpoint value S(t) from the controller 600. In this respect, reference is generally made here to the complex apparent power, that is to say the apparent power in terms of magnitude and phase. Such a power specification may often however also be made such that for example the active power P(t) and the reactive power Q(t) are predefined as separate values. Power or power specification are mentioned here below for the sake of simplification, this being able to mean active power and/or reactive power. It is furthermore clarified that this power depends on the time t, that is to say that no constant is used, but rather a value or a plurality of values that may fluctuate.

The infeed apparatus 602 then receives this power specification and generates a 3-phase current I therefrom, this current also being able to be referred to as infeed current here, which is fed into the electricity supply grid 604. A transformer could for example also be arranged between the infeed apparatus 602 and the electricity supply grid 604, this however not being the case here. A grid choke is likewise often provided, this also not being shown here and being able to be understood as part of the infeed apparatus 602. The infeed apparatus 602 may be formed of one or more inverters that draw their power in particular from a generator of a wind power installation. In order to control the power in accordance with the power specification S(t), it is often also necessary to control the power of said generator or to control this generator. This should be understood here as the power specification S(t) for the infeed apparatus 602. In other words, this power specification will also be incorporated for controlling a generator or controlling a required power source in another way. Such an implementation is known in principle to a person skilled in the art, and so no further details are explained here.

In a normal case in which the grid is operating stably and in particular no grid problem or grid fault has occurred, a normal control function generates the power specification S(t) in the normal control function block 606. To this end, the normal control function block 606 receives the grid voltage V and the grid frequency f as input variables.

To this end, the grid voltages V are recorded by the voltage measurement device 608 (e.g., voltmeter), which should also be understood to be merely a schematic illustration. The frequency f may be recorded from the grid voltage V recorded in this way using the frequency determination block 610 and then be incorporated into the normal control function block 606 as further input variable. The grid voltage V and the grid frequency f are not illustrated as time-dependent variables merely for the sake of simplicity. In fact, however, they are both time-dependent and this time dependency, that is to say their change over time, is often also relevant.

In any case, the normal control function block 606 then determines the power specification S(t) and this is transmitted to the infeed apparatus 602 by the selection apparatus 612 in the normal case, that is to say when no grid problem or fault is present or were present a short time ago and no stability loss of the electricity supply grid 604 should otherwise be expected either. The normal control function that is stored or implemented in the normal control function block 606 may in particular also determine an active power specification P as a function of the grid frequency and determine a reactive power specification Q as a function of the grid voltage V. The result may then be combined in the power specification S(t). In principle, however, it also comes into consideration for no reactive power component Q or no active power component P to be determined.

If a grid problem, grid fault or an end of such a grid fault is then present, then the selection apparatus 612 changes over and forwards a power specification S(t) from the support control function block 614 to the infeed apparatus 602.

Such a changeover may be triggered by recognizing a grid problem, grid fault or end of such a grid fault. This is illustrated in FIG. 6, by way of simplification, as an event E. This event E is recognized in an event recognition unit 616. It is pointed out at this juncture that both the event recognition unit 616 and the selection apparatus 612 and the other elements that are illustrated may also be designed differently. The structure shown overall for the controller 600 may in particular also be in the form of software in a controller, to cite just one further example.

In any case, the event recognition unit 616 illustrates that the event E may be detected depending on the grid voltage V and the grid frequency f. This may for example appear such that a voltage dip leads to the recognition of an event E. In this case, it would not be necessary to evaluate the grid frequency f. It however also comes into consideration that, without a voltage dip in the grid voltage V, a frequency oscillation occurs that is so great, and is thus able to be detected on the basis of the frequency f, that this leads to the recognition of an event E. In this respect, the dependency of the event E on the grid voltage V and the grid frequency f should also be understood such that both variables are monitored for this purpose. In principle, however, it also of course comes into consideration that both variables together lead to the recognition of an event E. Further variables may furthermore also be used, such as for example a time derivative of the grid frequency, to cite just one further example, which is however not shown here as input variable for the event recognition unit 616 for the sake of simplicity.

The support control function in the support control function block 614 receives the grid voltage V and the grid frequency f as input variables, in exactly the same way as the normal control function block 606. In addition, the support control function and therefore the support control function block 614 receives a time derivative $\dot{f}$ as further input variable from the grid frequency f. This derived grid frequency $\dot{f}$ is generated in the derivation apparatus 618. An active power P may in particular be generated depending on such a frequency derivative $\dot{f}$, or jointly take this into account.

There is furthermore also provision for frequency analysis or a DFT in the frequency analysis apparatus 620. The result is in particular a frequency spectrum f(f) of the grid frequency f. A characteristic oscillation of a synchronous generator 622 of a large-scale power plant 624, schematically illustrated in FIG. 6, is able to be recognized through frequency analysis, that is to say for example an appropriate Fourier transformation. This frequency-dependent frequency spectrum f(f) may thus likewise be evaluated in the event recognition unit 616, this not being illustrated here merely for the sake of simplicity. In particular, according to one embodiment, the event recognition unit 616 may identify the characteristic oscillating frequency of the synchronous generator 622 from the frequency spectrum f(f) of the grid frequency f that the frequency analysis apparatus 620 generated, and it may then be established when monitoring the grid frequency f whether the grid frequency f oscillates in line with this characteristic frequency of the synchronous generator 622. If this is performed at a suitably high amplitude, this may lead to an event E being recognized. This event E may accordingly also form an input variable for the support control function and thus the support control function block 614. Such a recognized event E may in this case be used for the support control function in the support control function block 614 as a temporal, specifically temporally accurate trigger, as it is called in the jargon.

The frequency spectrum f(f), which is likewise an input variable for the support control function block 614 according to the schematic illustration of FIG. 6, may in particular also be used to adjust the support control function or its parameterization. Dynamics, in particular an eigenvalue, of the support control function may in particular depend on a recorded characteristic oscillation frequency of the synchronous generator 622.

If an event E is thus recognized, the selection apparatus 612 changes over such that the power specification $\underline{S}(t)$ is predefined by the support control function in the support control function block 614, and to this end the support control function block 614 receives the grid voltage V, the grid frequency f and its derivative $\dot{f}$ as input variables. The frequency spectrum f(f) and the triggering or recognized event E may furthermore additionally be taken into account.

The eigentype and the behavior of the synchronous generator 622 are thereby able to be recorded and responded to specifically. As a result of the close proximity, in the electrical sense, between the synchronous generator 622 and the infeed apparatus 602, and thus a converter-controlled generation unit 601 (e.g., converter-controlled generator) for which the controller 600 and the infeed apparatus 602 stand together, this generation unit may be used to influence the behavior of the synchronous generator 622 in a targeted manner, specifically by cleverly feeding in a power $\underline{S}(t)$.

Figure 7:
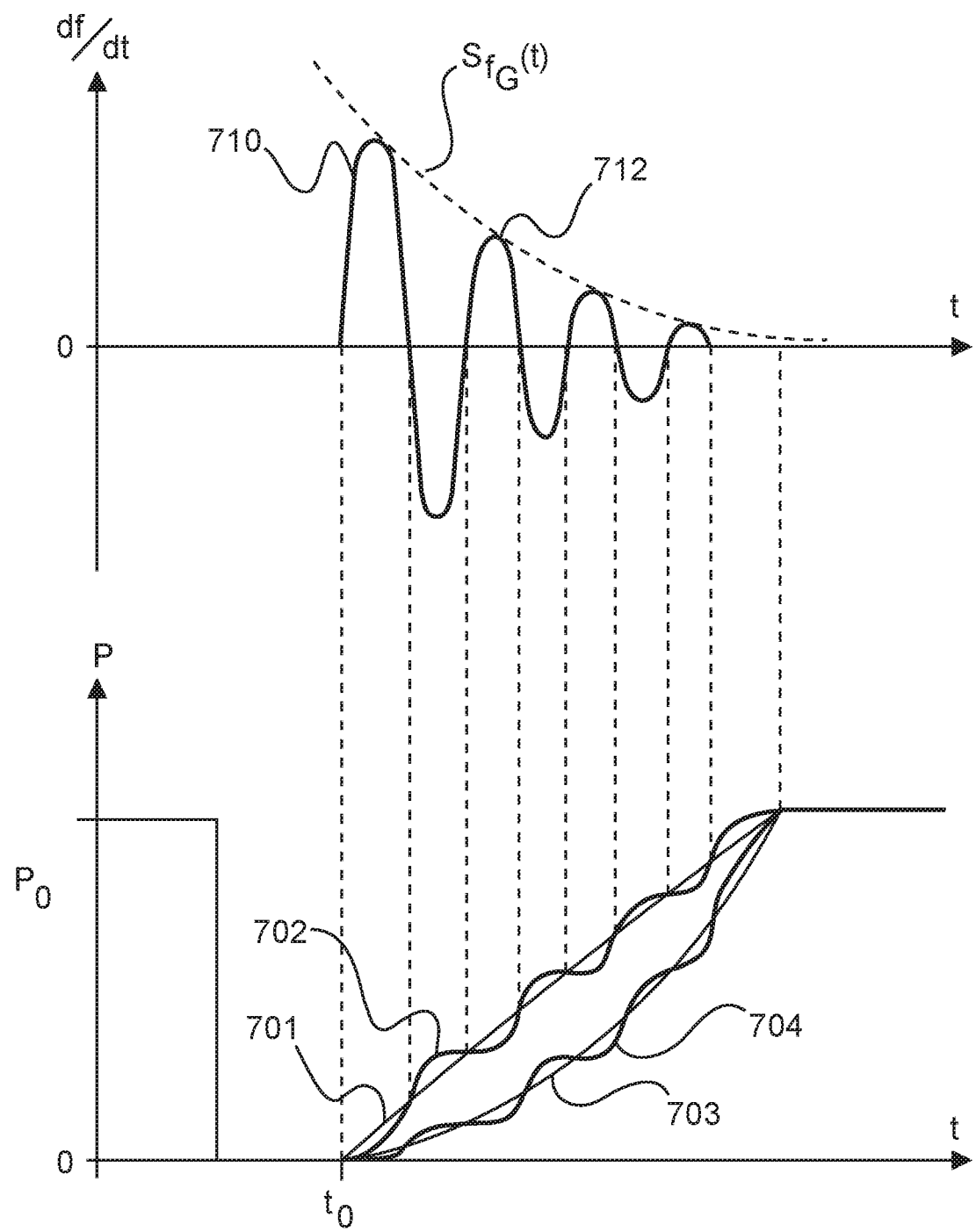
FIG. 7 schematically shows a graph with various strategies for increasing a power following a grid problem, grid fault or end of the grid fault.

FIG. 7 schematically shows a graph with various strategies for increasing a power following a grid problem, grid fault or end of the grid fault. In this case, the upper graph shows a frequency gradient 710 that may also be referred to mathematically as df/dt, with a subsiding amplitude. The lower graph in this respect shows various power increases as power profiles 701 to 704. Both graphs use the same time axis.

FIG. 7 in this case shows a power dip in which the power drops for example from a starting value $P_0$ to 0. The actual consideration or illustration however begins only at the time $t_0$ at which an infeed of power, specifically an infeed of active power, is then intended to be absorbed again. The oscillatory behavior of the frequency illustrated in the top graph or the illustrated oscillation of the frequency gradient 710 is also considered only after this time $t_0$. In particular, both graphs are not matched to one another in the region before the time $t_0$.

In any case, the grid frequency at the time $t_0$ has an approximately sinusoidal oscillation that subsides. The profile of the frequency gradient 710 is accordingly also approximately sinusoidal and subsiding. Also furthermore plotted is a profile of a peak value $S_{fG}(t)$ of the frequency gradient 710, which may also be referred to as peak value function 712. The peak value function 712 thus specifies, at all times, a maximum value of the frequency gradient 710, and thus forms for instance an upper curve of two enveloping curves of the oscillating frequency gradient.

Various options for increasing the power are specified in the lower graph as a function of the frequency gradient 710. The first power profile 701 forms a simple ramp that does not depend on the frequency gradient 710. Such a ramp may form the prior art, but it may also serve as a basis for being overlaid with a power function dependent on the frequency gradient 710.

The second power profile 702 shows such an overlay. This consists of the ramp of the first power profile 701 or a similar ramp, and a power function directly dependent on the frequency gradient and that forms the second power profile 702 when overlaid with the ramp. The power function directly dependent on the frequency gradient may for example be a function proportional to the frequency gradient. This thus results in a rise in the power, which may however counteract oscillations in a targeted manner, this being able to be achieved by the overlaid power function dependent on the frequency gradient. The power thus rises without in the process exciting the oscillation that is reflected in the frequency gradient 710. Such an oscillation is instead damped.

The third power profile 703 is dependent only on the peak value function, and thus does not consider the oscillation of the frequency gradient 710, but rather only the profile of the amplitude. The third power profile 703 therefore does not have any oscillation. It allows the power to rise only to a small extent at the start of the desired power increase. If the oscillation then subsides, the power may also be increased to a greater extent. The third power profile 703 thereby has a gradient that increases over time, this also being proposed as a general feature.

A further suggestion is that of overlaying a power function dependent on the frequency gradient 710 on the power profile 703. Instead of overlaying this power function on the ramped power profile 701, it is also proposed here to overlay this power function on the third power profile 703. The result is the fourth power profile 704. The described advantages are thereby able to be combined synergistically. The initially small rise in the third power profile prevents an excessively large power increase in an oscillating state and the power function directly dependent on the frequency gradient counter-controls the oscillations in a targeted manner. The small rise in the third power profile in particular also allows greater counter-control there through the power function directly dependent on the frequency gradient.

Figure 8A:
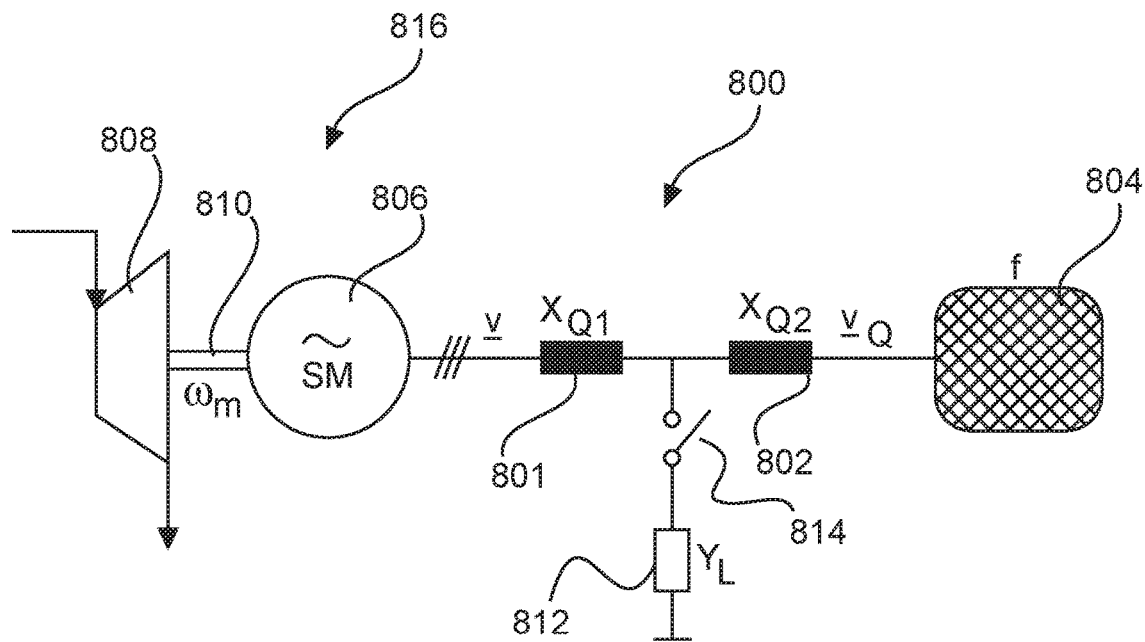
FIG. 8A schematically shows a grid structure with a directly coupled synchronous machine and a wind farm illustrated as consumer.
Figures 8B, 8C:
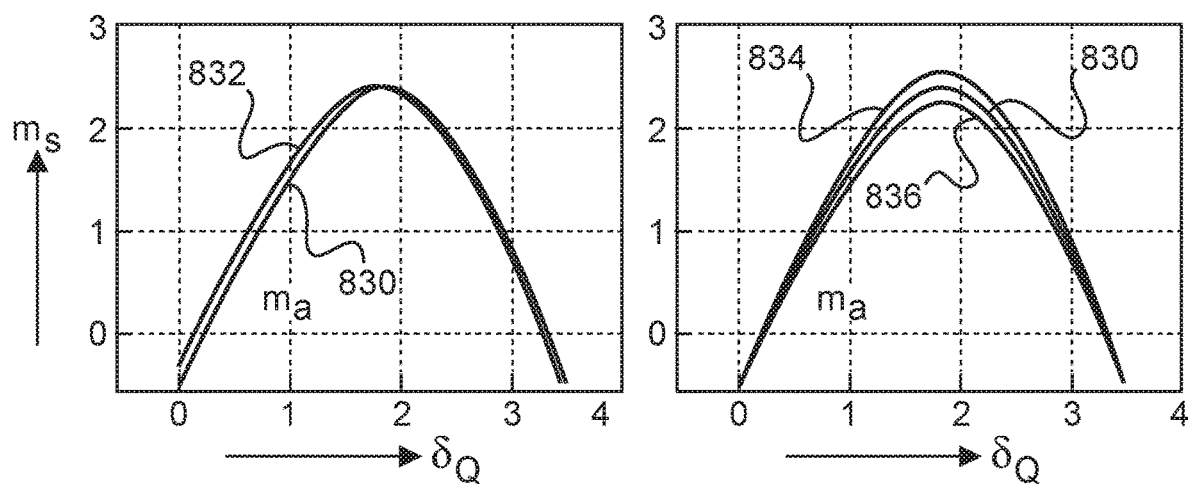
FIGS. 8B and 8C show operating characteristic curves for different conditions for the grid structure according to FIG. 8A.

The grid structure of FIG. 8A illustrates a grid section 800 that is formed essentially by a first and second reactance 801 and 802, which are assumed here to be of the same size for the sake of simplification. This grid section 800 is connected to the rest of the grid 804, which is assumed here for simplification purposes to be a fixed grid.

Also present is a synchronous machine 806, which may also be referred to as a synchronous generator and which is coupled directly, that is to say without the interposition of a converter, to the electricity supply grid, specifically here to the grid section 800 at the first reactance 801. The synchronous machine 806 may be driven by a turbine 808 with a drive shaft 810, this only being indicated here, and these three elements are also representative here of a power plant 816. The synchronous machine 806 is thereby connected to the rest of the grid 804 via this grid section 800. For this synchronous machine, the grid section 800, in particular the two reactances 801 and 802, forms a load flow path.

A wind farm 812 is represented here as consumer by an admittance $Y_L$ and is connected between the first and second reactance 801, 802. A switch 814 illustrates that the wind farm 812 may also be disconnected from the grid section 800.

The structure of FIG. 8A may be used to illustrate the effect of an infeed by the wind farm 812 on a stability reserve of the power plant 816, which is connected to the grid 804 by way of its synchronous machine 806.

The wind farm 812 and thus the infeed is in this case connected in the load flow path, specifically between the first and second reactance 801, 802.

With regard to the structure of FIG. 8A, FIG. 8B shows an operating characteristic curve 830 that illustrates a torque-pole wheel angle dependency of the synchronous machine 806 during normal operation in the case of a parallel infeed by the synchronous machine 806 and the wind farm 812.

FIGS. 8B and 8C use the same illustration as FIGS. 3 and 4.

FIG. 8B illustrates how an operating characteristic curve changes when an infeed of active power through the wind farm 812 is reduced. FIG. 8B also shows how the operating characteristic curve 830 of the synchronous generator 806 shifts to the left and upward with respect to the changed first characteristic curve 832 as a result of the reduction in the infeed of active power.

This results in possible braking surfaces, as shown in FIGS. 3 and 4, and such possible braking surfaces may be increased through the targeted shifting. It is thus able to be seen that this excitation, that is to say this reduction in the infeed of active power, improves the stability reserve, or that a maximum possible excitation is increased in the case of such stable post-fault conditions.

FIG. 8C on the other hand shows the influence of an additional infeed of reactive power on the torque-pole wheel angle dependency by the wind farm 812. The starting operating characteristic curve 830 corresponds to the operating characteristic curve 830 of FIG. 8B. The operating characteristic curve 830 of FIG. 8C thus again forms an operating characteristic curve in the case of a parallel infeed by the synchronous generator 806, that is to say the power plant 816 and the wind farm 812.

If the wind farm 812 then feeds in an additional capacitive and thus overexcited reactive current, the stability reserve (the possible braking surfaces) of the synchronous machine 806 increases as a result of the shifting of the torque-pole wheel angle characteristic curve, that is to say the operating characteristic curve 830 upward to form a changed second operating characteristic curve 834. This shift specifically increases or enlarges the braking surfaces as were explained in FIGS. 3 and 4.

For illustrative purposes, FIG. 8C also illustrates a response to an infeed of an inductive reactive current by the wind farm 812. This results in the changed third operating characteristic curve 836, which is shifted downward. This shows that this infeed of an inductive reactive current worsens the stability of the synchronous machine 806 in accordance with the lower operating characteristic curve 836.

By feeding in an inductive reactive current in combination with an active power reduction by the wind farm 812, for example only the pole wheel angle of the synchronous generator 806 of the power plant 816 may be changed. As a result, the effects may be overlaid in accordance with the changed first and second operating characteristic curve 832, 834. The shift in the other direction may accordingly take place through an increase in active power with a simultaneous capacitive current infeed.

According to a further embodiment, a behavior of a synchronous machine is emulated in order to control the power infeed by the converter-controlled generation unit, and a virtual synchronous machine with a virtual moment of inertia may be used as a basis for this. This behavior and/or an increase in the virtual moment of inertia is preferably activated following a voltage recovery. Activation may also be considered when the pre-fault grid frequency, that is to say the frequency that was present before the fault, passes through the oscillating frequency. This would correspond to passing through a point of equilibrium.

Active oscillation damping is also proposed as a further strategy.

A simulation of a series resistance for example comes into consideration for this purpose. This leads to a voltage-dependent active power infeed through the infeed current that flows through this series resistance in the simulation.

A simulation of a frequency-dependent load, which thus leads to a frequency-dependent infeed power or drawn power, also comes into consideration.

Other active damping methods in which for example a correspondingly modulated power is fed in also come into consideration.

The proposed measures concern a hybrid supply structure in which feeding-in takes place conventionally and in a converter-controlled manner at the same time. It is thus also proposed to take into account the converter saturation and to take the proposed measures depending thereon.

In the case of a very high proportion of a converter-controlled infeed, in particular >95%, according to one aspect, it is proposed to change over to an active power recovery that is as fast as possible. An instability tendency of the synchronous machine is accepted here, since priority has to be given to restoring the power balance in grids with a very high renewable saturation. This is in particular based on the finding that the inertia is low and the frequency sensitivity is high in such a system.

It has thus been recognized that, following a grid fault event, under some circumstances the type of active power recovery of converter-controlled feeders, such as for example photovoltaic systems (PV), wind power installations or battery stores, has an influence on the stability of synchronous machines. It has also been recognized that the effect is greatly dependent on the current proportion of converter-based feeders.

Up until now, a post-fault behavior was specifically prescribed in very few grid codes. Even if it is at all, only an active power recovery that is as fast as possible is mentioned. The resultant dynamic effects in the electrically nearby synchronous machines were not considered, and neither was the current proportion, that is to say the penetration, of converter-based feeders, that is to say of converter-controlled generation units, in the overall grid and in the vicinity of the corresponding wind power installation to be controlled.

A desired aim is thus also considered to be that of, in the future, making a fault ride-through behavior and also a post-fault behavior (FRT and post-FRT behavior) of a converter-controlled infeed unit dependent on the instantaneous penetration of the grid with converter-controlled infeed units and responding actively to an instability tendency. The following possibility should in particular be created for this aim:

Converter-controlled generation units respond to the post-fault behavior of the synchronous machines located nearby with tailored post-fault behavior.

A system stability and stability of electrically nearby synchronous generators in the case of a locally and globally high penetration with converter-controlled generation units is in particular intended to be achieved. Another intention is to achieve a situation whereby, in the future, more converter-controlled generation units are able to be built and connected to the grid, even if only a few directly coupled synchronous generators on the grid are still in operation.

The invention claimed is:

1. A method for feeding electric power into an electricity supply grid that has a grid frequency by way of a converter-controlled generator at a grid connection point, comprising:
feeding in the electric power depending on a control function, wherein the electric power includes active power and reactive power, wherein the control function controls the electric power depending on at least one state variable of the electricity supply grid;
permitting selecting between a normal control function and a support control function, different from the normal control function, as the control function;
determining that the electricity supply grid is operating in a stable condition;
selecting the normal control function when it is determined that the electricity supply grid is operating in the stable condition;
detecting a grid problem, a grid fault or an end of the grid fault;
selecting the support control function when the grid problem, the grid fault or end of the grid fault is detected; wherein:
the support control function controls the electric power to counteract an oscillation in the electricity supply grid, an oscillation of a synchronous generator connected to the electricity supply grid or an oscillation caused by the synchronous generator;
feeding the reactive power following the grid problem, grid fault or end of the grid fault;
using a reactive power function to feed in the reactive power, wherein the reactive power function specifies a relationship between a recorded voltage and the reactive power;
permitting selecting between a first and a second reactive power function as the reactive power function;
selecting the first reactive power function when it is determined the electricity supply grid is operating in the stable condition, or selecting the second reactive power function if a generator oscillation of the synchronous generator, associated with oscillation to the grid connection point, has been recorded, or if the generator oscillation is predicted; and
feeding the reactive power using a voltage-dependent reactive power support function, wherein the second reactive power function has a larger gain in terms of magnitude between the recorded voltage and the fed-in reactive power than the first reactive power function, wherein the normal control function includes the first reactive power function and the support control function includes the second reactive power function.

2. The method as claimed in claim 1, comprising:
counteracting an oscillation caused by a response of the synchronous generator coupled directly to the electricity supply grid to the grid problem, the grid fault, or the end of the grid fault.

3. The method as claimed in claim 1, comprising:
recording whether at least one synchronous generator associated with oscillation to the grid connection point is coupled to the electricity supply grid, wherein the synchronous generator associated with the oscillation to the grid connection point is arranged in a proximity of the grid connection point or acts to on the grid connection point, wherein a generator oscillation of the at least one the synchronous generator in which the at least one the synchronous generator oscillates in relation to an operating point or is measurable at the grid connection point as a frequency fluctuation or as a voltage fluctuation.

4. The method as claimed in claim 1, comprising:
recording a frequency gradient in the electricity supply grid and at the grid connection point, and
following the grid problem, the grid fault or the end of the grid fault, resuming an active power infeed by the converter-controlled generator, and increasing the active power infeed with time, wherein increasing the active power infeed is performed in accordance with at least one rule from:
increasing the active power infeed depending on the recorded frequency gradient, wherein the active power infeed is increased at a slower rate in the case of a positive frequency gradient than in the case of a negative frequency gradient,
increasing the active power infeed depending on the recorded frequency gradient such that a rate of the increase is decelerated with an increasing frequency gradient, and is accelerated with a decreasing frequency gradient, and
increasing the active power infeed depending on a peak value of an oscillating frequency gradient such that, when the peak value is reduced with decelerating frequency oscillation, the rate of the increase in the active power infeed is increased.

5. The method as claimed in claim 1, comprising:
recording a frequency value of the grid frequency in the electricity supply grid and at the grid connection point, and
following the grid problem, grid fault or end of the grid fault,
resuming an active power infeed by the converter-controlled generator, and
increasing the active power infeed with a rate of increase, wherein the rate of increase depends on a peak value of the grid frequency, wherein the peak value decreases as frequency oscillation decreases, and wherein when the peak value decreases, the rate of increase of the active power infeed increases.

6. The method as claimed in claim 1, wherein
the support control function implements a behavior of a virtual synchronous machine with a rotor inertia having a predefined moment of inertia,
the behavior of the virtual synchronous machine is implemented at least such that:
a change in the grid frequency results in a change in active power and the change in the fed-in active power is positively correlated with the predefined moment of inertia, or
a fed-in infeed current lags or leads a grid voltage when the grid frequency changes, and the lag or lead is positively correlated with the predefined moment of inertia.

7. The method as claimed in claim 6, comprising:
activating the behavior of the virtual synchronous machine or increasing the moment of inertia following the grid problem, grid fault or end of the grid fault, or
activating the behavior of the virtual synchronous machine or increasing the moment of inertia if oscillation of the grid frequency is detected, when the oscillating frequency passes through a pre-fault grid frequency that was recorded before the grid problem or grid fault occurred.

8. The method as claimed in claim 1, comprising:
implementing damping control for active oscillation damping in the support control function, or
to feed in electric power, modulating a fed-in or drawn reactive power by modulating the converter-controlled generator as an admittance.

9. The method as claimed in claim 8, wherein the damping control includes at least one function from:
a simulation or emulation of a frequency-dependent load; and
a simulation or emulation of a voltage-dependent load.

10. The method as claimed in claim 1, comprising:
selecting or parameterizing the support control function depending on a converter saturation, wherein the converter saturation is a measure of a proportion of power fed in by converter-controlled generators into the electricity supply grid to an overall power fed into the electricity supply grid.

11. The method as claimed in claim 10, wherein the overall power includes power fed in by synchronous machines coupled directly to the electricity supply grid.

12. The method as claimed in claim 1, wherein the support control function includes performing damping, and the normal control function does not include performing the damping.

13. The method as claimed in claim 12, wherein the support control function includes performing damping, and the normal control function does not include performing the damping.

14. The method as claimed in claim 1, wherein:
when an oscillation of at least one synchronous machine is recorded in the electricity supply grid, a rapid active power recovery is performed.

15. The method as claimed in claim 14, wherein a converter proportion is a measure of power fed in by converter-controlled generators into the electricity supply grid to an overall power fed into the electricity supply grid, and wherein in response to the converter proportion being at least 90%, the rapid active power recovery is a faster active power recovery than predefined by the support control function.

16. A converter-controlled generator for feeding electric power into an electricity supply grid that has a grid frequency, comprising:
an infeed apparatus configured to feed in the electric power depending on a control function, wherein the electric power includes active power and reactive power; and
a controller configured to:
implement the control function, wherein the control function controls the electric power depending on at least one state variable of the electricity supply grid;
permit selection between a normal control function and a support control function, different from the normal control function, as the control function;
select the normal control function when it is determined that the electricity supply grid is operating in a stable condition, and select the support control function when a grid problem, grid fault or an end of the grid fault has been determined recognized, wherein the support control function controls the electric power to counteract an oscillation in the electricity supply grid, an oscillation of a synchronous generator connected to the electricity supply grid or an oscillation caused by the synchronous generator;
cause the reactive power to be fed following the grid problem, grid fault or end of the grid fault;
use a reactive power function for causing the reactive power to be fed, wherein the reactive power function specifies a relationship between a recorded voltage and the reactive power;
select between a first and a second reactive power function as the reactive power function;
select the first reactive power function when it is determined the electricity supply grid is operating in the stable condition, or select the second reactive power function if a generator oscillation of the synchronous generator, associated with oscillation to a grid connection point, has been recorded, or if the generator oscillation is predicted; and
cause the reactive power to be fed using a voltage-dependent reactive power support function, wherein the second reactive power function has a larger gain in terms of magnitude between the recorded voltage and the fed-in reactive power than the first reactive power function, wherein the normal control function includes the first reactive power function and the support control function includes the second reactive power function.

17. The converter-controlled generator as claimed in claim 16, wherein the converter-controlled generator is a wind power installation.

18. A wind farm having a plurality of wind power installations including the wind power installation as claimed in claim 17, comprising:
a farm controller configured to generate power setpoint values and transmit the power setpoint values to the plurality of wind power installations.

19. A method for feeding electric power into an electricity supply grid that has a grid frequency by way of a converter-controlled generator at a grid connection point, comprising:
feeding in the electric power depending on a control function, wherein the electric power includes active power and reactive power, wherein the control function controls the electric power depending on at least one state variable of the electricity supply grid;
permitting selecting between a normal control function and a support control function, different from the normal control function, as the control function;
determining that the electricity supply grid is operating in a stable condition;
selecting the normal control function when it is determined that the electricity supply grid is operating in the stable condition;
detecting a grid problem, a grid fault or an end of the grid fault;
selecting the support control function when the grid problem, the grid fault or end of the grid fault is detected; wherein:
the support control function controls the electric power to counteract an oscillation in the electricity supply grid, an oscillation of a synchronous generator connected to the electricity supply grid or an oscillation caused by the synchronous generator; and
selecting or parameterizing the support control function depending on a converter saturation, wherein the converter saturation is a measure of a proportion of power fed in by converter-controlled generators into the electricity supply grid to an overall power fed into the electricity supply grid.

* * * * *